Nov. 24, 1964    C. S. CONRAD    3,158,806
APPARATUS FOR PERFORMING A GROUND LINE
CONTINUITY TEST AT REDUCED VOLTAGE
Filed Oct. 3, 1960
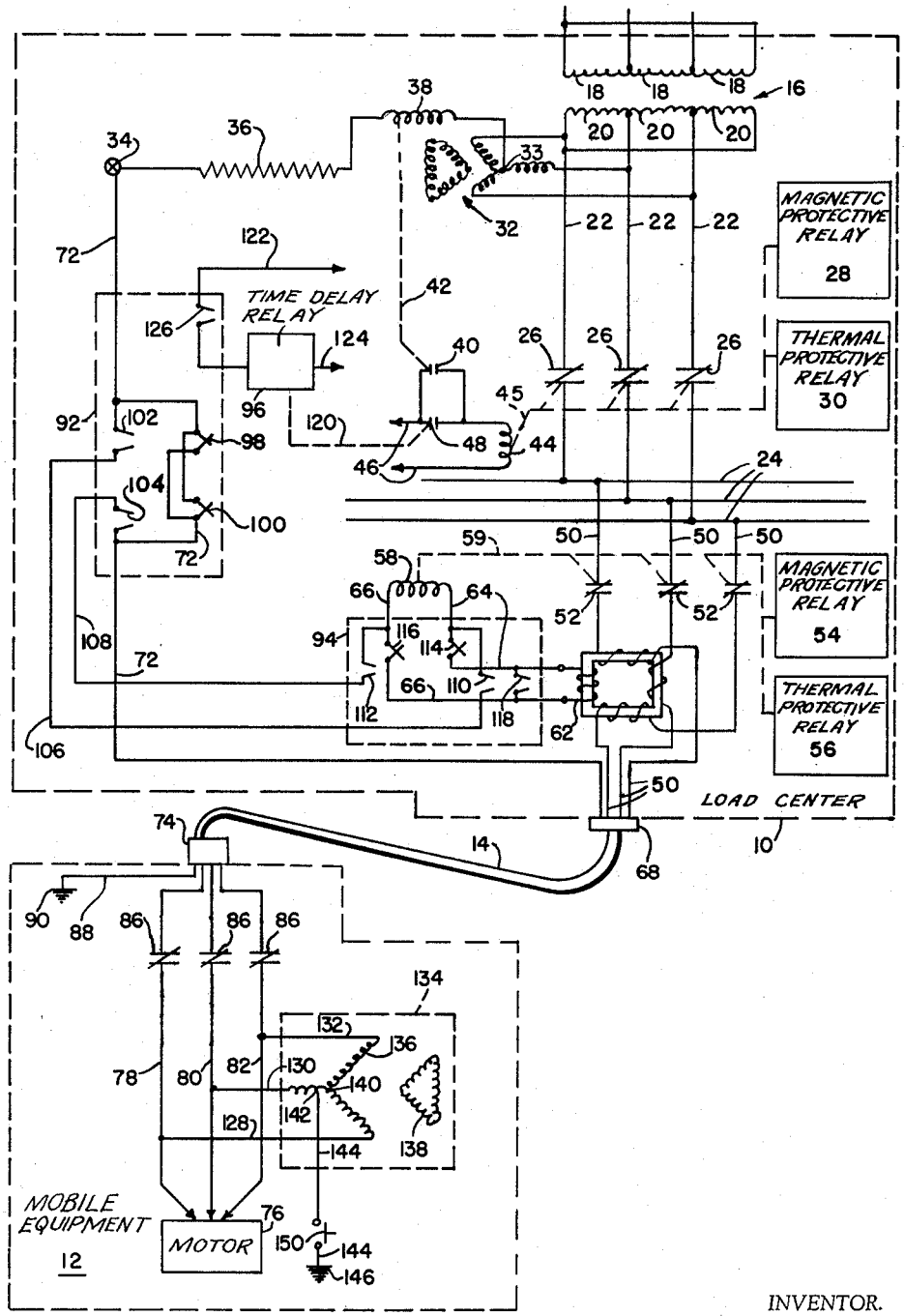
INVENTOR.
CHESTER S. CONRAD
BY Stanley J Price
his ATTORNEY

United States Patent Office 3,158,806
Patented Nov. 24, 1964

3,158,806
APPARATUS FOR PERFORMING A GROUND LINE CONTINUITY TEST AT REDUCED VOLTAGE
Chester S. Conrad, Fairmont, W. Va., assignor to Consolidation Coal Company, Pittsburgh, Pa., a corporation of Pennsylvania
Filed Oct. 3, 1960, Ser. No. 59,877
3 Claims. (Cl. 324—51)

The present invention relates to a method and equipment for testing the ground line of grounded electrical equipment for continuity and more particularly to a method and equipment for testing high voltage A.C. ground lines by conditioning the high voltage equipment to respond to a lowered test voltage and thereafter impressing the lowered test voltage on the ground line and observing the response.

In electrical equipment, particularly high voltage A.C. equipment that is utilized in coal mines, it is important that the equipment be adequately grounded for operational safety. Power is transmitted to most A.C. powered mobile mining equipment, such as mining machines, shuttle cars, drills, or the like by a trailing cable which is connected at one end to the particular piece of equipment and at the other end to the terminal of the load center which supplies the power. The trailing cable includes three power conductors each of which conducts one A.C. phase and a ground conductor or ground line which is secured to the frame of the particular mining machine involved and which is grounded at the load center. Thus, the ground line grounds the frame of the mining machine at a point adjacent the load center.

To insure that the mining machine is adequately grounded at all times, the continuity of the ground line from the machine to the load center must be periodically checked. Until the present invention, the checking of a ground line for continuity could be a relatively hazardous operation. The standard ground line continuity check for A.C. powered mining equipment was to intentionally cause a full line voltage ground fault at the mining machine in order to observe whether the circuit breaker at the load center was tripped or opened in response to the ground fault. If the circuit breaker was opened, then there was ground continuity from the machine to the load center and the machine was properly grounded.

When the ground continuity test was accomplished in the foregoing manner, the frame of the mining machine was subjected to full line voltage; that is the voltage between the line and neutral. The machine operator performing the ground check was seated on the machine while the machine was subjected to this full line voltage by an intentional ground fault. So long as the operator did not touch the floor or passages or other source of ground while seated on the machine he was perfectly safe. However, if he touched ground while the ground check was being performed, there was the possibility that he would be subjected to full line voltage and be electrocuted. Further, if someone walking in the mine passage happened to touch the mining machine while the ground check was being performed, he too might meet with a fatal accident.

The present invention is directed to accomplishing a ground line continuity check without exposing personnel to the hazards of full line voltage ground checks. This invention contemplates a novel method and novel equipment for accomplishing a ground continuity test at voltages substantially lower than full line voltage so that the hazards of full line voltage ground faults will not be present during the testing operation. In practicing the present invention, the load center from which the mining equipment is powered is modified to respond to a ground fault substantially lower than a full line voltage ground fault. When so modified, the load center may be observed while a ground fault at a lowered test voltage is intentionally imposed upon the mining equipment. If the load center responds, as by opening a circuit breaker, to the lowered voltage ground fault, then ground continuity from the equipment to the load center is assured. Broadly stated then, the present invention consists of (1) conditioning the load center to respond to a gorund fault of reduced voltage, (2) providing an intentional ground fault of reduced voltage on the mining equipment, and (3) observing the response at the load center to the intentional ground fault.

In order to accomplish conditioning of the load center, test blocks are installed at strategic locations within the load center. These test blocks form certain strategic wiring junctions within the load center. The test blocks are equipped with sockets which receive test jacks which are similar to the jacks utilized on telephone switchboards. With the test jacks removed, the test blocks cause the wiring of the load center to remain as conventional load centers are wired. When the test jacks are inserted, certain circuits of the load center are opened and other circuits are closed so that the load center is substantially rewired to respond to a reduced ground fault voltage.

In accomplishing the ground continuity check of the present invention, the test jacks are inserted in the load center to condition the load center to respond to a reduced ground fault voltage. The mobile mining equipment is equipped with a test transformer which transforms the line voltage to a substantially reduced test voltage. The test transformer is then grounded to the frame of the mining equipment to create an intentional ground fault at reduced test voltage. The response at the load center is observed and if the circuit breaker within the load center is tripped it is apparent that there is ground continuity from the equipment to the load center. However, if the circuit breaker remains closed, corrective action must be taken to determine the opening in the ground line. Once the test is completed, the test jacks are removed and the load center is returned to its normal wiring condition and again responds only to high voltage ground faults as is desired in normal operation.

A standard load center usually consists of an incoming line with line voltage impressed thereon. The incoming line directs current to a main bus within the load center through a main circuit breaker. The main bus feeds a series of branch circuits which may power individual pieces of mining equipment. Each of the branch circuits has a branch circuit breaker between the main bus and the corresponding piece of equipment so that if there is trouble on one of the branch circuits, the branch circuit breaker will be tripped open while the main circuit breaker feeding the main bus and the remaining branch circuits on which there is no trouble may remain in operation. As a precaution against inadvertently leaving the test jacks mounted within the load center and thereby causing damage to the load center, a time delay relay is actuated when the test jacks are installed to practice the present invention. This time delay relay is set to close a circuit to the main circuit breaker tripping relay to open the main circuit breaker after a predetermined time period. This predetermined time period is designed to be long enough to permit the ground test to be accomplished. When the test jacks are removed, the time delay relay is no longer actuated. In the event that a ground check is accomplished and the test jacks are inadvertently left in place, then the time delay relay will cause tripping of the main circuit breaker within the load center which, through loss of power to all equipment fed by that load center, will indicate to operating personnel that the test jacks have not been removed and that they should be removed before the load center is put back into operation.

With the foregoing considerations in mind, it is a primary object of the present invention to provide a safe method of accomplishing a ground line continuity check.

It is another object of this invention to provide simple, inexpensive modifications to load center equipment and mobile mining equipment to perfom safe ground line continuity tests on the equipment.

It is another object of this invention to provide a test which is designed to be performed within a predetermined time period and to permit modification of the load center for test purposes only during the predetermined time period.

These and other objectives achieved by this invention will become apparent as this description proceeds in conjunction with the accompanying drawing.

The drawing is a schematic circuit diagram of the load center and a piece of mining equipment modified to practice the present invention.

Referring to the drawing, a load center 10 and a power consuming piece of mobile equipment 12 such as a mining machine, a shuttle car, a drill, or the like are connected by a trailing cable 14.

In describing the structure of the load center 10 and the mobile equipment 12, the standard unmodified wiring configurations will first be described in detail. The modifications of the standard equipment to accomplish the present invention will then be described in detail followed by the method of performing a completely safe ground continuity check by the present invention.

The load center 10 contains a transformer 16 that has delta-connected primary coils 18 which receive 4,160 volts, 3 phase A.C. from an outside source. The delta-connected secondary coils 20 of transformer 16 produce 480 volts, 3 phase A.C.

Current from secondary coils 20 is conducted through a three-phase conductor 22 to a main bus 24 through a main circuit breaker 26. Main circuit breaker 26 is equipped with a magnetic protective relay 28 and a thermal protective relay 30 each of which are shown schematically in the drawing. As is conventional in delta-connected transformers, a Y connected zigzag transformer 32 is associated with conductor 22 to establish a neutral at 33. The neutral of zigzag transformer 32 is connected to a ground stud 34 through a ground resistor 36 and the actuating coil 38 of a protective relay having contactors 40. The connecting of the zigzag transformer to the ground stud 34 through a ground resistor is completely conventional.

The relay having actuating coil 38 and contactors 40, connected by the mechanical linkage 42, is utilized to close a circuit to the main circuit breaker trip relay coil 44 which opens circuit breaker 26 through mechanical linkage 45 in the event of a ground fault. Since the relay having coil 38 and contactors 40 controls the load center main circuit breaker 26, it is set to respond to only a relatively large ground fault current so that ordinarily the branch circuit breakers are opened before the main circuit breaker 26.

Trip relay coil 44 has lines 46 to conduct current from a local control-voltage source to relay coil 44. The contactors 40 close one possible circuit to the trip relay coil 44, in the event of a ground fault, to open circuit breaker 26. The contactors 48 may also close a second circuit to actuate trip relay coil 44. The function of contactors 48 will be discussed in greater detail at a later point in this specification.

The main bus 24 may have several branch circuits extending therefrom. One three-phase branch conductor 50 is shown in the drawing. Branch conductor 50 has a branch circuit breaker 52 disposed therein. Circuit breaker 52 has a magnetic protective relay 54 and a thermal protective relay 56 which are indicated schematically. The branch circuit breaker 52 also has a ground fault trip relay coil 58 which opens the circuit breaker 52 through mechanical linkage 59 when trip relay coil 58 is actuated by current passing therethrough.

In order to detect ground faults in the branch circuits, a ring type current transformer 60 is provided on conductor 50. The coil 62 of transformer 60 is connected by lines 64 and 66 respectively to the trip relay 58. In the event that there is a ground fault within the branch circuit fed by conductor 50, unbalanced current will flow within the individual phase conductors of three-phase conductor 50 thereby creating a ground fault current in transformer 60. This ground fault current in coil 62 will be conducted to relay coil 58 through lines 64 and 66. The actuation of relay coil 58 causes the circuit breaker 52 to open in response to the ground fault. Relay coil 58 is designed to be more responsive to a ground fault than is relay coil 38 controlling the main circuit breaker. Accordingly, a smaller ground fault will cause circuit breaker 52 to open than will cause main circuit breaker 26 to open.

Conductor 50 is joined to a three phase trailing cable terminal 68 formed on the load center 10. A ground line 72 within the load center 10 connects the trailing cable terminal 68 to the ground stud 34 on a normal, unmodified load center.

The mining equipment 12 to be powered by branch circuit conduit 50 has a three phase trailing cable terminal 74 formed thereon. The three phase trailing cable 14 joins the load center terminal 68 with the machine terminal 74. Trailing cable 14 has three insulated phase conductors contained therein. Cable 14 also has a ground conductor or ground line insulated from the phase conductors and solidly connected through load center terminal 68 to ground line 72 within the load center.

The mining equipment 12 has a motor 76 that has phase conductors 78, 80 and 82 connecting it with the trailing cable terminal 74. Circuit breakers 86 are included in each of the phase conductors 78, 80 and 82. The ground line in trailing cable 14 is connected through terminal 74 to a ground line 88 within the mobile equipment 12 and ground line 88 is anchored solidly to the vehicle frame at 90.

As described thus far, the load center 10 and the mobile mining equipment 12 are completely conventional. Hitherto, in order to perform a ground continuity check an intentional ground fault was created by grounding one of the phase conductors 78, 80 or 82 to the frame of the machine 12 at full line voltage to see whether the circuit breaker 52 would trip in response to the ground fault. The hazards of creating a ground fault at full line voltage on the mining equipment have been discussed above.

In order to practice the present invention, the previously described load center 10 is modified by adding test blocks 92 and 94 and time delay relay 96. The test block 92 contains normally closed ground line contactors 98 and 100 which when closed provide a continuous ground line 72 from the trailing cable terminal 68 to the ground stud 34. The test block 92 also contains ground test contactors 102 and 104. Ground test contactor 102 is normally open and is provided in a ground test conductor 106 which connects test block 92 to test block 94. Ground test contactor 104 is located in ground test conductor 108 which also connects test block 92 to test block 94.

Within test block 94, conductor 106 contains a ground test contactor 110 which is normally open. The ground test conductor 106 joins line 64 which connects to trip relay coil 58. Ground test conductor 108 contains a ground test contactor 112 within the test block 94. Test contactor 112 is normally open. The conductor 108 joins line 66 which connects to test relay coil 58.

The test block 94 also contains transformer disconnect contactor 114 disposed in line 64 and transformer disconnect contactor 116 disposed in line 66. Contactors 114 and 116 are normally closed so that trip relay coil 58 is normally connected to the coil 62 of transformer 60. When test jacks are inserted, however, the normally closed contactors 114 and 116 are opened to disconnect the relay coil 58 from transformer 62. In order to render the transformer 60 ineffective when contactors 114 and 116 are open, a normally open transformer shorting contactor 118 is closed to directly connect lines 64 and 66 to short circuit the coil 62.

The test block 92 also controls the time delay relay 96 which controls the contactors 48 through mechanical linkage 120. Time delay relay 96 has lines 122 and 124 which connect it to a source of electrical current not shown. The source of electrical current may be the same source to which lines 46 that control the main circuit breaker trip relay coil 44 are connected. In series with the time delay relay 96 is a time delay actuating contactor 126 disposed within the test block 92. Contactor 126 is normally opened so that no current can flow through time delay relay 96.

The foregoing modifications to the load center 10 by the addition of test blocks 92, 94 and time delay relay 96 allow the load center 10 to be conditioned for a response to a low voltage test ground fault. Each of the test blocks 92 and 94 are adapted to receive test jacks such as are utilized on telephone switchboards. So long as the test jacks are not inserted within test blocks 92 and 94 the normally closed contactors 98 and 100 within the test block 92 and the normally closed contactors 114 and 116 within the test block 94 remain closed. Likewise, so long as the test jacks are not inserted the normally open contactors 102, 104 and 126 within test block 92 and the normally open contactors 110, 112, and 118 within the test block 94 remain open and the load center is conventional and unmodified. When, however, the test jacks are inserted in the test blocks 92 and 94 the normally open contactors are closed and the normally closed contactors are opened so that the load center is substantially rewired to respond to a lower test voltage ground fault as will be described. It will be appreciated that while the test blocks and test jacks are a convenient method of accomplishing the modification of the load center 10 for test purposes, similar modification could be accomplished by utilizing toggle switches or other positionable electrical controls to condition the load center 10 to respond to a lower test voltage as will be described.

The mining equipment 12 must be only slightly modified to produce a ground fault at a lowered ground fault test voltage. To accomplish this modification, taps 128, 130 and 132 are secured to phase conductors 78, 80 and 82 respectively. Taps 128, 130 and 132 are Y connected to the primary coil of a test transformer 134. The secondary, delta-connected coil 138 of transformer 134 is unloaded. The Y connected primary coil 136 of transformer 134 produces a neutral point 140 in the circuit. The transformer primary coil 136 is tapped at a point removed from the neutral point 140 so that a test voltage having a peak of from 30 to 50 volts may be obtained through the tap 142. A ground test line 144 is secured to the tap and anchored to the vehicle frame at 146. A normally open ground test switch 150 may be closed to provide a ground fault from tap 142 to anchor 146 when desired.

Under normal equipment operating conditions, the ground test switch 150 remains open. The test jacks are not inserted within the test blocks 92 and 94 so that the load center operates normally. If a ground fault should occur, the unbalanced currents flowing in the individual phase conductors of three phase conductor 50 would cause a current to be conducted through trip relay 58 which would, in turn, open circuit breaker 52.

In order to perform a ground continuity check according to the present invention, the test jacks (not shown) are inserted into test blocks 92 and 94. When the test jacks are inserted in test block 92, the normally closed contactors 98 and 100 are opened so that there is no longer a direct ground line from trailing cable terminal 68 to ground stud 34, but rather, ground line 72 is broken. Normally open contactors 104 and 102 are closed. The closing of contactors 104 and 102 creates a conductive path from load center terminal 68 through ground line 72, contactor 104, conductor 108, to the test block 94. There is also a conductive path from ground stud 34 through ground line 72, contactor 102, conductor 106 to test block 94.

With the test jack inserted in test block 92, the contactor 126 is closed and current is conducted to time delay relay 96. Time delay relay 96 is set to keep line 46 open for approximately five minutes after the first passage of current into relay 96. After approximately five minutes of continuous current passage through time delay relay 96, it closes the contactors 48 through mechanical linkage 120 thereby causing circuit breaker 26 to trip and opening the conductor 22 from transformer 16 to the main bus 24. Under normal testing conditions, the test jacks will be removed from the test block 92 before the time delay relay 96 ever has an opportunity to close contactors 48 and trip circuit breaker 26.

The insertion of test jacks (not shown) into test block 94 closes the normally open contactors 110, 112 and 118 and opens the normally closed contactors 114 and 116. The opening of contactors 114 and 116 and the closing of contactor 118 isolates the trip relay 58 from the transformer coil 62. The closing of contactors 110 and 112 completes a circuit from conductor 72 through contactor 104 in test block 92, through conductor 108, through contactor 112 in test block 94, through line 66, through trip relay 58, through line 64, through contactor 110, through line 106, and through contactor 102 to ground line 72.

After the test jacks have been inserted in test blocks 92 and 94, the ground test may be performed. The test is initiated when the ground test switch 150 on the mining machine 12 is closed so that a peak ground test voltage of from 30 to 50 volts passes from transformer 134 to the frame of the machine 12. This creates an artificial test ground fault at the machine and the current from the artificial ground fault can flow through the conductive path of ground line 88, machine trailing cable terminal 74, the ground line of trailing cable 14, and the terminal 68 of the load center 10. The ground line of the trailing cable 14 is fixed to ground line 72 within the load center terminal 68. Accordingly, the conductive path from the machine frame to terminal 68 will be continued by ground line 72, contactor 104, the conductor 108, contactor 112, line 66, into relay coil 58 and through line 64, contactor 110, conductor 106, contactor 102, ground line 72 to ground stud 34.

If there is a continuous ground line, the relay coil 58 will be actuated when a test ground fault current flows through relay 58 by the path set forth in the preceding paragraph, thereby tripping circuit breaker 52. The tripping of circuit breaker 52 will indicate to an observer at the load center that there is a continuous ground line and the test jacks may then be removed from the test blocks 92 and 94 to permit the load center to resume normal operations.

In the event that the test jacks are inadvertently left in the test blocks 92 and 94, approximately five minutes after their insertion the time delay relay coil 96 will close contactors 48 thereby actuating relay 44 and tripping circuit breaker 26. When main circuit breaker 26 is tripped, the resulting loss of power in the load center will indicate that the test jacks have not been removed.

Because the ring type transformer 60 operates on the unbalanced current flowing in conductor 50 when an accidental ground fault occurs in the branch fed by conductor 50, the current within coil 62 is relatively small even with a full line voltage ground fault and the current acting upon relay coil 58 in normal operation is, therefore, relatively small. Accordingly, if the test voltage ground fault of 30 to 50 volts were grounded to the mining equipment without preconditioning the load center as discussed herein, the unbalanced current in the conductor 50 would not be sufficient to actuate the relay 58 and thereby indicate a continuous ground from the equipment back to the load center. For test purposes, it is necessary to precondition the load center so that relay coil 58 receives the entire reduced ground fault test voltage rather than the transformed unbalanced current as it does in an accidentally occurring ground fault.

It will be noted that with only 30 to 50 volts creating the test ground fault, there is no danger to operating personnel in performing the ground check. At the same time, the modifications to the load center and to the mining equipment are relatively simple and inexpensive so that they may be accomplished with little or no difficulty.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. In an electrical power system including a source of current available in a load center at a predetermined line voltage, circuit means including a circuit breaker and conductors to conduct said current from said source to a consuming device, a circuit breaker trip coil mechanically connected to said circuit breaker, a ground line connecting said consuming device to a ground within said load center in order to ground said consuming device, and a current transformer electrically connected to said conductors and to said circuit breaker trip coil to excite said trip coil upon the occurrence of a ground fault to operate said circuit breaker to thereby open said circuit breaker, the improvement comprising a continuity testing means for said ground line, said testing means including means to selectively disconnect said current transformer from said circuit breaker trip coil, means to selectively connect said ground line to said ground through said trip coil within said load center so that current flowing in said ground line flows through said trip coil, and test transformer means in said circuit means and on said consuming device to selectively provide a ground fault test current to said ground line at a voltage substantially lower than said line voltage.

2. In an electrical power system having a load center with a source of A.C. electrical current, circuit means including a circuit breaker and conductors to control the flow of current at line voltage from said source to consuming equipment, a circuit breaker trip coil mechanically connected to said circuit breaker, a ground line connecting a ground within said load center and the frame of said consuming equipment, and a current transformer electrically connected to said conductors and to said circuit breaker trip coil to excite said trip coil upon the occurrence of a ground fault to operate said circuit breaker to thereby open said circuit breaker, the improvement comprising a continuity testing means for said ground line, said testing means including means to selectively disconnect said current transformer from said circuit breaker trip coil, means to selectively connect said ground line to said ground through said trip coil within said load center so that current flowing in said ground line flows through said trip coil, and test transformer means mounted on said consuming equipment and having primary coils electrically connected to said conductor, a low voltage tap on said test transformer means primary coils, a test switch connected to said low voltage tap and said consuming equipment frame and selectively closable to impress a ground fault test current upon said ground line at a voltage substantially lower than said line voltage.

3. In an electrical power system including a load center having a source of three phase A.C. at a predetermined line voltage, circuit means including first three phase conducting means to conduct current from said source to a main three phase bus within said load center, a main circuit breaker in said first three phase conducting means, second three phase conducting means to conduct current from said main bus to consuming mobile equipment, a branch circuit breaker in said second three phase conducting means, a circuit breaker trip coil mechanically connected to said branch circuit breaker, a ground line connecting a ground within said load center to said consuming mobile equipment, first relay coil means mechanically connected to said main circuit breaker and powered by a control voltage source to open said main circuit breaker when actuated, and current transformer means electrically connected to said branch circuit breaker trip coil and to said second three phase conducting means, said current transformer means operable upon the occurrence of a ground fault to operate said circuit breaker trip coil to open said branch circuit breaker, the improvement comprising a continuity testing means for said ground line, said testing means including means to selectively disconnect said current transformer means from said branch circuit breaker trip coil, means to selectively connect said ground line to said ground through said branch circuit breaker trip coil within said load center so that current flowing in said ground line flows through said branch circuit breaker trip coil, time delay means including a time delay relay and contactors to selectively connect said first relay coil means to said control voltage source in order to actuate said first relay coil means and thereby open said main circuit breaker after a predetermined elapsed time period, said time delay means constructed and arranged to leave said control voltage source disconnected from said first relay coil means at all times prior to the termination of said elapsed time period without said first relay coil means being actuated, and test transformer means in said circuit means mounted on said consuming mobile equipment and connected to said second three phase conducting means to selectively provide a ground fault test current to said ground line at a voltage substantially lower than said line voltage.

References Cited in the file of this patent

UNITED STATES PATENTS

| | | |
|---|---|---|
| 2,010,840 | Baughman | Aug. 13, 1935 |
| 2,478,147 | Wilson | Aug. 2, 1949 |
| 2,447,625 | Astin | Aug. 24, 1948 |